US007783064B2

(12) United States Patent
Laich

(10) Patent No.: US 7,783,064 B2
(45) Date of Patent: Aug. 24, 2010

(54) HEARING AID SYSTEM

(75) Inventor: Markus Laich, Erlangen (DE)

(73) Assignee: Siemens Audiologische Technik GmbH, Erlangen (DE)

( * ) Notice: Subject to any disclaimer, the term of this patent is extended or adjusted under 35 U.S.C. 154(b) by 1161 days.

(21) Appl. No.: 11/408,252

(22) Filed: Apr. 20, 2006

(65) Prior Publication Data

US 2006/0245596 A1 Nov. 2, 2006

(30) Foreign Application Priority Data

May 2, 2005 (DE) ...................... 10 2005 020 316

(51) Int. Cl.
*H04B 1/00* (2006.01)
*H04R 5/00* (2006.01)
*H04R 25/00* (2006.01)

(52) U.S. Cl. ........................... 381/119; 381/1; 381/316

(58) Field of Classification Search ................ 381/23.1, 381/312, 316, 320
See application file for complete search history.

(56) References Cited

U.S. PATENT DOCUMENTS 5,757,932 A 5/1998 Lindemann et al.
6,549,633 B1 * 4/2003 Westermann ............... 381/312
2003/0215106 A1 * 11/2003 Hagen et al. ................ 381/313
2004/0175005 A1 9/2004 Roeck
2004/0196994 A1 * 10/2004 Kates ......................... 381/320
2004/0252852 A1 * 12/2004 Taenzer ...................... 381/119

FOREIGN PATENT DOCUMENTS

DE 696 31 781 T2 7/1998
EP 0 855 130 B1 7/1998
EP 1 320 281 A2 6/2003
EP 1 365 628 A2 11/2003
WO WO 99/43185 A1 8/1999

* cited by examiner

*Primary Examiner*—Brian Ensey
*Assistant Examiner*—Sunita Joshi

(57) ABSTRACT

In the case of binaural coverage, the perception with one-sided sound reception should be improved. Provision is made for this purpose to transmit the receive signals of the hearing devices alternately and if necessary to generate a mono signal from the input signals with a specific weighting, said mono signal being presented at both ears. It is likewise conceivable to use only those spectral components of the input signals to generate the mono signal, said spectral portions having the higher level in each instance.

7 Claims, 1 Drawing Sheet

HEARING AID SYSTEM

CROSS REFERENCE TO RELATED APPLICATIONS

This application claims priority to the German Application No. 10 2005 020 316.7, filed May 2, 2005 which is incorporated by reference herein in its entirety.

FIELD OF INVENTION

The present invention relates to a hearing device system with a left hearing device for coverage of the left ear of a hearing device wearer and a right hearing device for coverage of the right ear of a hearing device wearer. Furthermore, the present invention relates to a corresponding method for the binaural coverage of a hearing device wearer.

BACKGROUND OF INVENTION

With hearing impaired persons, problems frequently arise with the perception of sound, which the person only attains from one side, as the hearing damage is generally specific to one side. Problems particularly occur with speech perception. In these situations, persons without hearing damage have considerable advantages, since speech signals can be significantly better detected using binaural perception.

SUMMARY OF INVENTION

The problem worsens in the case of one-sided sound sources, for example when using the telephone. If, in this case, the coverage of the telephoning ear is not sufficient, the speech perception is all the more reduced, as the other ear is unable to make any contribution whatsoever.

A digital hearing aid system with two receiver elements is known from the publication DE 696 31 781 T2. Each receiver element features a microphone. The output of the microphone is connected to the input of an analog-to-digital converter in the receiver element and also to the output of an analog-to-digital converter in the receiver element via a communication link. The output of the microphone in the second receiver element is likewise connected to the inputs of both analog-to-digital converters. In a respective subsequent digital processor, either a mono or stereo signal is generated as a function of the request by a user. The signals of both microphones are only processed in both digital processors if stereo signal processing has been requested. If mono signal processing has been requested, only the output signal of the one microphone is processed in the one digital processor and only the output signal of the second microphone in the other digital processor.

An object of the present invention is thus to improve the perception and in particular the speech perception with one-sided sound sources for hearing impaired persons.

In accordance with the invention, this object is achieved by a hearing device system with a left hearing device for coverage of the left ear of a hearing device wearer and a right hearing device for coverage of the right ear of the hearing device wearer, with the two hearing devices each comprising a transmission facility, with which the input signal of each of the hearing devices can be transmitted to the respective other hearing device, in particular wirelessly, and the two hearing devices each comprise a signal processing facility, with which a mono signal can be generated in each instance from both input signals in both hearing devices.

Furthermore, provision is made according to the invention for a method for the binaural coverage of a hearing device wearer by recording a left input signal by means of a hearing device on the left ear of a hearing device wearer and by recording a right input signal by means of a hearing device on the right ear of the hearing device wearer as well as transmitting the respective input signal to another hearing device, in particular wirelessly, and generating a mono signal in each instance from both input signals for each ear.

The technology according to the invention allows both ears of a hearing device wearer to be covered with a correspondingly processed mono signal, even with one-sided acoustic sources. In particular, the probability that the voice can be correctly perceived thus increases.

The mono signal can preferably be generated in the respective signal processing facility of the hearing devices of the hearing device system by means of averaging both input signals. The input level value of both input signals can be averaged for instance and can be used for the further signal processing of the two hearing devices as a common input signal.

According to a further preferred embodiment, the input signal which is received at the associated hearing device, can be more significantly weighted in every signal processing facility for the generation of the mono signal than the input signal of another hearing device. A certain side selectivity can be achieved in this manner, whereby a compromise can be reached between stereo and mono reception.

The two input signals are favorably weighted at a ratio of 2:1 for the generation of the mono signal. A certain stereo perception is thus possible and a mono base coverage is simultaneously ensured.

With a special embodiment, a comparison of the input signals can be carried out in each of the two signal processing facilities and the mono signal is generated in each instance exclusively from spectral components of the input signals, which feature the higher level in the respective frequency range. The hearing device wearer can thus always perceive an optimized signal on both sides.

BRIEF DESCRIPTION OF THE DRAWINGS

The present invention is now described in more detail below with reference to the appended drawings, in which.

DETAILED DESCRIPTION OF INVENTION

The exemplary embodiments illustrated in more detail below represent preferred embodiments of the present invention.

According to a first exemplary embodiment, the received signals, i.e. the input signals of both hearing devices of a hearing device system are transmitted in each instance to another hearing device using a wireless audio transmission system. The transmission can however also be carried out wired. For the wireless transmission, any radio standard or also non-standardized systems can be used. The transmission between the hearing devices can also be carried out via an additional control device.

Figure 1:
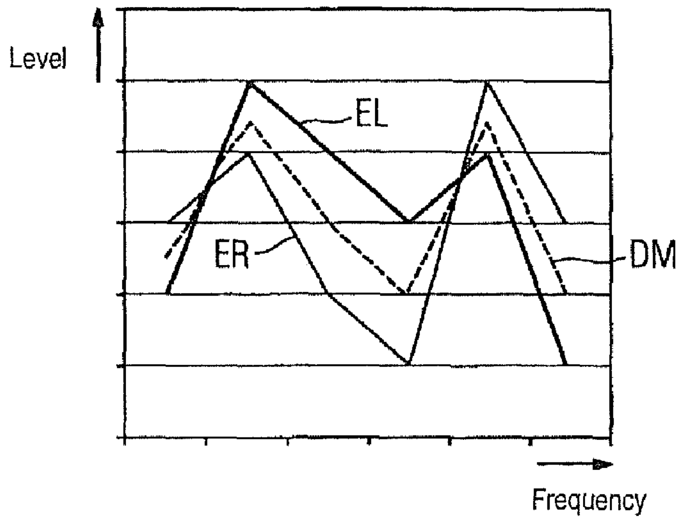
FIG. 1 shows the signal waveform with a mono circuit.

In FIG. 1, the input signal EL for the left ear and the input signal ER for the right ear are plotted above the frequency with their respective levels. A mono signal is now generated in each hearing device from the two input signals EL and ER. For this purpose, an average signal DM is formed from both input signals EL and ER. This average signal DM is used as an input signal for the further signal processing. Thus the same mono signal can be presented to both ears.

It is worth noting here that the signals displayed in FIG. 1 can also display output signals of the respective signal processing of the corresponding hearing device.

According to a second embodiment, a so-called partial mono signal is generated from the input signals EL and ER instead of an average mono signal. The input signals EL and ER received by both hearing devices are also transmitted here to the respective other hearing device using wireless audio transmission. In each hearing device, the directly received input signal is then more powerfully weighted than the input signal received by the other hearing device.

Figure 2:
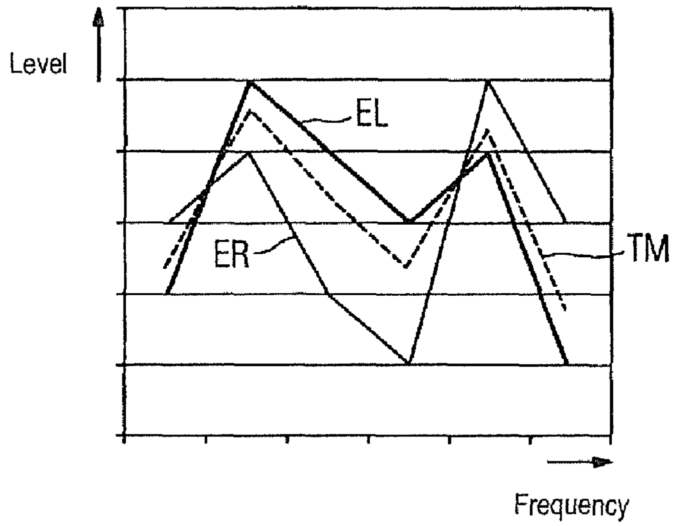
FIG. 2 shows the signal waveform with a weighted mono circuit.

FIG. 2 shows the signal spectra of the input signals EL and ER for the left and right ear, as well as the partial mono signal TM generated therefrom. In the present case, the two input signals for the generation of the partial mono signal are weighted at a ratio of 2:1, with the input signal EL of the left ear achieving the higher weighting, since the displayed partial mono signal TM was generated for the left ear. It should be noted here that the partial mono signal TM lies closer to the input signal EL for the left ear.

For overview purposes, the partial mono signal for the right ears, which is generated in the right hearing device, is not drawn in FIG. 2. This partial mono signal for the right ear lies closer to the input signal ER for the right ear as a result of the weighting ratio 2:1.

This weighting allows a compromise between a stereo and mono reception to be reached, since at each ear the sound for the mono signals which arrived at this ear is taken into account to a greater degree. Pure stereo would be achieved in the case of an infinite weighting ratio. The weighting ratio 1:1 corresponds to the first exemplary embodiment according to FIG. 1.

With a third embodiment of the present invention, a so-called maximal mono signal is generated. The signals received by both hearing devices are in turn transmitted wirelessly to another hearing device in each instance. The more powerful signal in the respective spectral component, i.e. said signal with the higher level, is used for this spectral component to generate a mono signal.

Figure 3:
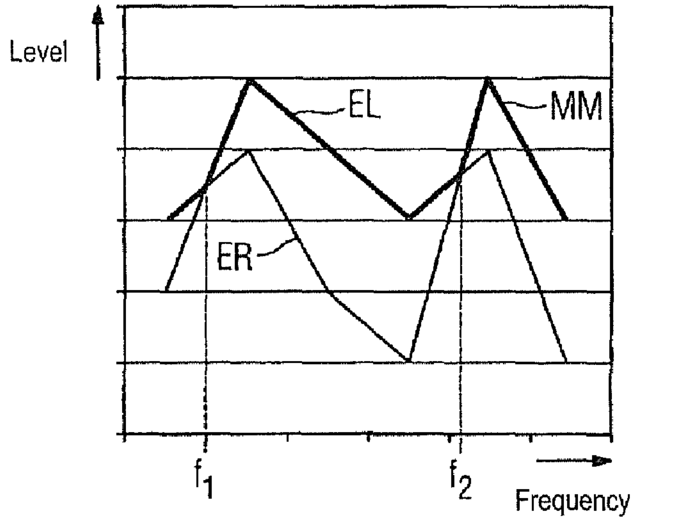
FIG. 3 shows the signal waveform with a so-called maximal mono circuit.

FIG. 3 serves to explain the generation of the maximal mono signal MM. In the spectral region prior to frequency f1, the input signal ER at the right ear is greater than the input signal EL at the left ear. The input signal ER is consequently used in this frequency segment for the mono signal MM. The left input signal EL is greater than the right input signal ER between the frequencies f1 and f2, so that the former is used here for the maximal mono signal MM. After the frequency f2, the right input signal ER is again greater than the left input signal EL, so that the spectral component of the right input signal ER is used here for the generation of the mono signal MM. This signal generation ensures that the most powerful possible input signal is always presented to both hearing devices as a mono signal.

The mono circuits and/or mono programs corresponding to the above-mentioned embodiments, with which average, partial or maximal mono signals can be generated for binaural hearing devices, ensure that hearing impaired persons hear in both ears during telephone conversations for instance. This significantly improves speech perception.

One variant of the above-displayed embodiments consists in a mono signal being generated only in the region of the speech frequencies, whilst the remaining frequencies are filtered and/or a stereo reproduction is enabled. This also promotes the improved perception of speech.

A further variant of the above-described embodiment consists in selecting a hearing device, the input signals of which are transmitted on both devices. This would equate the input signal of the hearing device (not selected) being weighted with zero. In this way, it is possible for instance, to fade out the sound being received at the ear which is not using the telephone.

The invention claimed is:

1. A hearing aid system, comprising:

a left hearing aid having a first input signal for supplying the left ear of a hearing aid user; and a right hearing aid having a second input signal for supplying the right ear of the hearing aid user, wherein the left and right hearing aids each include:

a transmission unit for transmitting the input signal of the respective hearing aid to the respective other hearing aid; and a signal processing device for generating in the respective hearing aid a first and second acoustic mono signal from a side-selective weighed average of the first and second input signals, wherein the first acoustic mono signal is generated in the left hearing aid by averaging the first and second input signals after significantly weighting the first input signal in the left hearing aid, and wherein the second acoustic mono signal is generated in the right hearing aid by averaging the first and second input signals after significantly weighting the second input signal in the right hearing aid, providing side-selectivity in each respective hearing aid such that the first acoustic mono signal lies closer to the first input signal for the left hearing aid and the second acoustic mono signal lies closer to the second input signal for the right hearing aid.

2. The hearing aid system according to claim 1, wherein the input signal related to the respective hearing aid is weighted 2:1 relative to the input signal related to the respective other hearing aid.

3. The hearing aid system according to claim 1, wherein each transmission unit is configured for wireless transmission.

4. A hearing aid system, comprising:

a left hearing aid having a first input signal for supplying the left ear of a hearing aid user; and a right hearing aid having a second input signal for supplying the right ear of the hearing aid user, wherein the left and right hearing aids each include:

a transmission unit for transmitting the input signal of the respective hearing aid to the respective other hearing aid; and a signal processing device for generating in the respective hearing aid a maximal acoustic mono signal from the first and second input signals, wherein each signal processing device is configured in each spectral region to:

compare respective signal levels of the first and second input signals; and generate the maximal acoustic mono signal such that the respective input signal having a higher signal level than the corresponding respective other input signal is used for generating the acoustic maximal mono signal, wherein when the first input signal has the higher signal level, the first input signal becomes the acoustic maximal mono signal and when the second input signal has the higher signal level, the second input signal becomes the acoustic maximal mono signal.

5. The hearing aid system according to claim 4, wherein each transmission unit is configured for wireless transmission.

6. A method for binaurally supplying a hearing aid user, comprising:

receiving a first input signal by a left hearing aid worn on or in the left ear of the hearing aid user;

receiving a second input signal by a right hearing aid worn on or in the right ear of the hearing aid user;

transmitting the first input signal to the right hearing aid and transmitting the second input signal to the left hearing aid; and generating in each hearing aid a first and second acoustic mono signal from a side-selective weighed average of the first and second input signals, wherein the first acoustic mono signal is generated in the left hearing aid by averaging the first and second input signals after significantly weighting the first input signal in the left hearing aid, and wherein the second acoustic mono signal is generated in the right hearing aid by averaging the first and second input signals after significantly weighting the second input signal in the right hearing aid, providing side-selectivity in each respective hearing aid such that the first acoustic mono signal lies closer to the first input signal for the left hearing aid and the second acoustic mono signal lies closer to the second input signal for the right hearing aid.

7. The method according to claim 6, wherein the first and second input signals are wirelessly transmitted.

* * * * *